US012012302B2

(12) United States Patent
Jussila et al.

(10) Patent No.: US 12,012,302 B2
(45) Date of Patent: Jun. 18, 2024

(54) COMMUNICATION SYSTEM FOR TRANSMITTING SAFETY INFORMATION IN AN ELEVATOR SYSTEM

(71) Applicant: KONE Corporation, Helsinki (FI)

(72) Inventors: Ari Jussila, Helsinki (FI); Juha-Matti Aitamurto, Helsinki (FI); Arttu Leppäkoski, Helsinki (FI); Antti Hovi, Helsinki (FI)

(73) Assignee: KONE Corporation, Helsinki (FI)

( * ) Notice: Subject to any disclaimer, the term of this patent is extended or adjusted under 35 U.S.C. 154(b) by 1516 days.

(21) Appl. No.: 16/284,896

(22) Filed: Feb. 25, 2019

(65) Prior Publication Data

US 2019/0270610 A1 Sep. 5, 2019

(30) Foreign Application Priority Data

Mar. 1, 2018 (EP) .................................... 18159414

(51) Int. Cl.
*B66B 1/34* (2006.01)
*B66B 5/00* (2006.01)
*G08B 21/02* (2006.01)

(52) U.S. Cl.
CPC .......... *B66B 1/3461* (2013.01); *B66B 1/3446* (2013.01); *B66B 5/0031* (2013.01); *G08B 21/02* (2013.01)

(58) Field of Classification Search
CPC ....... B66B 5/0031; B66B 1/3415; B66B 3/00; B66B 3/008; B66B 1/34; B66B 1/3453;
(Continued)

(56) References Cited

U.S. PATENT DOCUMENTS 6,173,814 B1 1/2001 Herkel et al.
10,919,733 B2 * 2/2021 Hovi ...................... B66B 13/22
(Continued)

FOREIGN PATENT DOCUMENTS

CN 1297842 A 6/2001
CN 1342128 A 3/2002
(Continued)

OTHER PUBLICATIONS

Chinese Office Action and Search Report for Chinese Application No. 201910140863.1 dated Mar. 23, 2022.

*Primary Examiner* — Marlon T Fletcher
(74) *Attorney, Agent, or Firm* — Birch, Stewart, Kolasch & Birch, LLP

(57) ABSTRACT

According to an aspect, there is provided a communication system for transmitting safety information in an elevator system. The communication system comprises a first node; and a second node; wherein the first node is configured to receive first safety information from a first safety node via two parallel communication channels, to convert the received first safety information into a serial form for transmission in a first safety message over a single communication channel between the first node and the second node and to transmit the first safety message to the second node over the single communication channel; and the second node is configured to receive the first safety message and to convert the first safety information in the first safety message back into the parallel form for transmission via two parallel communication channels to a second safety node.

20 Claims, 3 Drawing Sheets

(58) Field of Classification Search
CPC ..... B66B 1/3446; B66B 13/22; B66B 1/3461; B66B 5/0018; B66B 5/0006; B66B 1/3423; B66B 5/0093; B66B 1/06; B66B 1/32; B66B 13/143; B66B 5/0043
See application file for complete search history.

(56) References Cited

U.S. PATENT DOCUMENTS

| | | | | |
|---|---|---|---|---|
| 2002/0189907 | A1 | 12/2002 | Motoyama et al. | |
| 2015/0114764 | A1* | 4/2015 | Taylor | B66B 1/3453 187/393 |

FOREIGN PATENT DOCUMENTS

| | | | | | |
|---|---|---|---|---|---|
| CN | 103287932 | A | | 9/2013 | |
| CN | 195784825 | A | | 7/2016 | |
| CN | 107098231 | A | * | 8/2017 | |
| CN | 197198153 | A | | 8/2017 | |
| CN | 110217657 | A | * | 9/2019 | B66B 1/3446 |
| CN | 112978524 | A | * | 6/2021 | |
| DE | 112010001370 | T5 | * | 9/2012 | B66B 1/34 |
| EP | 1 103 510 | A2 | | 5/2001 | |
| EP | 1 151 952 | A2 | | 11/2001 | |
| EP | 3 187 448 | A1 | | 7/2017 | |
| EP | 2125591 | B1 | * | 7/2017 | B66B 13/22 |
| EP | 3533741 | A1 | * | 9/2019 | B66B 1/3446 |
| JP | 2003146214 | A | * | 5/2003 | |
| WO | 2012/072859 | A1 | | 6/2012 | |
| WO | 2015/059565 | A1 | | 4/2015 | |

* cited by examiner

COMMUNICATION SYSTEM FOR TRANSMITTING SAFETY INFORMATION IN AN ELEVATOR SYSTEM

BACKGROUND

Elevators use cables to transfer electrical power and control signals from an elevator control cabinet to an elevator car. The elevator control may be disposed in a separate machine room or in case of an elevator without a machine-room, for example, in a door frame of a landing door. Therefore, the cables may become long and thus heavy, especially in high-rise elevators. Hence, also arrangements are needed for cable stabilization as the cables are exposed to sway and oscillation.

It would be beneficial to alleviate at least one of these drawbacks.

SUMMARY

According to at least some of the aspects, a solution is provided that enables transmitting safety information in an elevator system over a single communication channel. The solution enables simplifying cabling to an elevator car in the elevator system.

According to a first aspect, there is provided a communication system for transmitting safety information in an elevator system. The communication system comprises a first node and a second node. The first node is configured to receive first safety information from a first safety node via two parallel communication channels, to convert the received first safety information into a serial form for transmission in a first safety message over a single communication channel between the first node and the second node and to transmit the first safety message to the second node over the single communication channel. The second node is configured to receive the first safety message and to convert the first safety information in the first safety message back into the parallel form for transmission via two parallel communication channels to a second safety node.

In an embodiment, the second node is configured to receive second safety information from the second safety node via the two parallel communication channels and to convert the second safety information into a serial form for transmission in a second safety message over the single communication channel between the first node and the second node; and the first node is configured to receive the second safety message and to convert the second safety information in the second safety message back into the parallel form for transmission via the two parallel communication channels to the first safety node.

In an embodiment, in addition or alternatively, the first safety information consists of a first part received via the first parallel communication channel (108) and a second part received via the second parallel communication channel (108). The first node is configured to determine timing difference between the first part of the first safety information and the second part of the first safety information and to add the timing difference to the first safety message; and the second node is configured to convert the first safety information back into the parallel form based on the timing difference for the transmission via two parallel communication channels to the second safety node.

In an embodiment, in addition or alternatively, the first node is configured to receive the first safety information in predetermined cycles from the first safety node.

In an embodiment, in addition or alternatively, the single communication channel between the first node and the second node is a wireless communication channel. When implementing wireless communication between the first node and the second node, no cabling for transmitting safety information is needed between the first node and the second node.

In an embodiment, in addition or alternatively, the single communication channel between the first node and the second node is a wired communication channel. When implementing wired communication between the first node and the second node, only a single cable can used between the first node and the second node.

According to a second aspect, there is provided a safety system of an elevator system. The safety system comprises a communication system according to the first aspect, and further comprises a first safety node and a second safety node. The first safety node is configured to send first safety information comprising at least one request to the second safety node via the communication system; and the second safety node is configured to send second safety information comprising a response to the first safety node via the communication system in response to receiving the at least one request.

In an embodiment, the first safety node is configured to send the first safety information in predetermined cycles.

In an embodiment, in addition or alternatively the second safety node is configured to send the second safety information within the predetermined cycle.

According to a third aspect, there is provided an elevator system. The elevator system comprises an elevator car, and the safety system according to the second aspect; wherein the second node is configured in the elevator car of the elevator system.

According to a fourth aspect, there is provided a method for transmitting safety information in a communication system of an elevator system. The method comprises receiving, by a first node, first safety information from a first safety node via two parallel communication channels; converting, by the first node, the received first safety information into a serial form for transmission in a first safety message over a single communication channel between the first node and the second node; transmitting, by the first node, the first safety message to the second node over the single communication channel; receiving, by the second node, the first safety message; and converting, by the second node, the first safety information in the first safety message back into the parallel form for transmission via two parallel communication channels to a second safety node.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION

There may be two kinds of data communication transferred via travelling cables towards/from an elevator can in an elevator system: data communication concerning normal operations and service, and data communication concerning safety data. Control signals not related to safety may be transferred wirelessly instead of using travelling cables. However, safety-related communication needs to be communicated in a fail-safe manner. If a dangerous situation is detected, or if a communication failure takes place, an elevator must be able to be brought to a safe state without an excessive delay. An acceptable delay may be, for example, in some situations hundred(s) of milliseconds, and in some situations ten(s) of milliseconds or even less. Due to this, communication of safety information may be implemented with a time-critical protocol, a "time-stamp" protocol, such that every safety message has a dedicated distinct time window. If a message is missing from its time window, an error may be determined and safety measures may be triggered to stop elevator operation. To improve the reliability of the communication, communication channels may be doubled such that safety messages are communicated in two parallel channels redundantly.

The solution disclosed herein aims to provide a communication system for transmitting safety information such that safety information of an elevator system may be communicated over a single communication channel. The solution enables simpler design for safety critical communication in an elevator system yet ensuring the reliability of the communication.

Figure 1A:
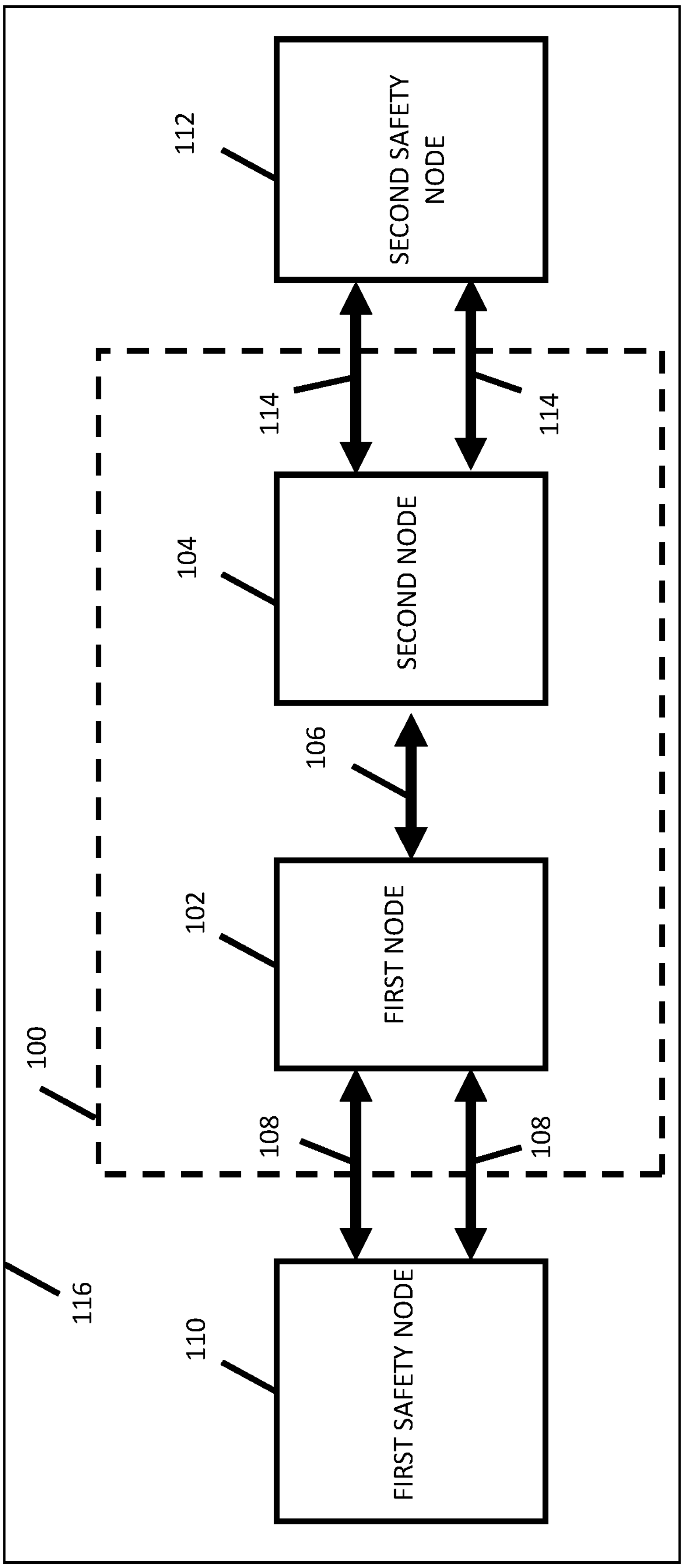
FIG. 1A illustrates a communication system for transmitting safety information in an elevator system according to an embodiment.

FIG. 1A illustrates a communication system 100 for transmitting safety information in an elevator system according to an embodiment.

The communication system 100 comprises a first node 102 and a second node 104. The first node 102 is configured to receive first safety information from a first safety node 110 via two parallel communication channels 108 (i.e. the first parallel communication channel 108 and the second parallel communication channel 108), to convert the received first safety information into a serial form for transmission in a first safety message over a single communication channel 106 between the first 102 and the second node 104 and to transmit the first safety message to the second node over the single communication channel. The second node 104 is configured to receive the first safety message and to convert the first safety information in the first safety message back into the parallel form for transmission via two parallel communication channels 114 to a second safety node 112. The two parallel communication channels 108, 114 may refer to, for example, a two-channel data bus. The single channel 106 may be a wireless communication channel or a wired communication channel, thus eliminating the need for two separate physical channels used in traditional elevator communication systems for transmitting safety information between an elevator car and a controlling entity. If the single channel 106 is a wireless communication channel, the first node 102 and the second node 104 may comprise a transceiver that provides wireless data transmission capabilities. The transceiver may comprise a Wi-Fi transceiver or any other wireless transceiver enabling long or short range wireless data transfer.

The second node 104 may be further configured to receive second safety information from the second safety node 112 via the two parallel communication channels 114 and to convert the second safety information into a serial form for a transmission in a second safety message over the single communication channel 106 between the first 102 and the second node 104. The first node 102 may be configured to receive the second safety message and to convert the second safety information in the second safety message back into a parallel form for transmission via the two parallel communication channels 108 to the first safety node 110.

In an embodiment, the first safety information consists of a first part received via the first parallel communication channel (108) and a second part received via the second parallel communication channel (108). The first node 102 may be configured to determine timing difference between the first part of the first safety information and the second part of the first safety information. The timing difference may be then added to the first safety message. The time difference may be added, for example, to a header of the first safety message or to a payload part of the message. The second node 104 may be configured to convert the first safety information back into the parallel form based on the timing difference. This means that the second node is able to reproduce the original two-channel messages received from the first safety node by utilizing the received timing difference information. The second safety node 112 thus receives the safety information via the two parallel communication channels 114 with the same timing difference as in the sending side, i.e. at the first safety node 110.

The first node 102 may also be configured to receive the first safety information in predetermined cycles from the first safety node 110. Thus, by sending the timing difference with the first safety message, synchronization may be kept identical both on the sending and the receiving side.

The communication system 100 for transmitting safety information illustrated in FIG. 1A may be part of a safety system 116 of an elevator system. In addition to the communication system 100, the safety system 116 may comprise the first safety node 110 and the second safety node 112. The first safety node 110 may be configured to send the first safety information comprising at least one request to the second safety node 112 via the communication system 100. The second safety node 112 may be configured to send the second safety information comprising a response to the first safety node 110 via the communication system 100 in response to receiving the at least one request. In an example, the first safety node 110 may be configured to send the first safety information in predetermined cycles, for example, in a specific transmission slot.

The first safety node 110 and the second safety node 112 may comprise two independently operating processors each connected to a separate communication channel 108, 114. When the communication system is turned on, the two processors of the first safety node 110 may boot independently. The time-stamp protocol in both communication channels 108 may start independently and operate in a predetermined operation cycle. For example, if the operation cycle is 16 ms, this means that a deviation between the communication channels 108 may be a maximum of 8 ms. Each processor may have, for example, crystal oscillators, which may further cause asynchronous operation. Although the processors are independent from each other, the processor pairs in each safety node 110, 112 may co-operate in some functions. Therefore, timing may be important.

In one example, one or more sensors or contacts, for example, one or more car safety contacts, one or more door sensors, one or more position sensors, one or more car roof sensors, and/or one or more safety contacts, may be connected to the first safety node or second safety node, and the sensors and/or contacts may measure or be associated with safety critical information or operations.

As an energy saving function, one of the processors may switch on power supply provided for the sensors only for the duration of a reading event. Both of the processors may then determine readings from the sensors and the two separately acquired readings may be compared. If the channels are not synchronized, one of the processors may read the information in at a wrong time, for example, during a time when the power supply for the sensors is switched off. The synchronization may be kept identical on the sending and the receiving side when the first node 102 adds the timing difference to the first safety information, as described above.

Each of the two processors in the first safety node 110 may periodically send the first safety information comprising at least one request to the communication channel 108. In addition to the at least one request, the first safety information sent by the first safety node 110 may comprise, for example, an operational mode of an elevator. In response to the at least one request, the second safety node 112 may measure the time from receipt of the request to recognize its individual time slot for sending the second safety information comprising a response. In an embodiment, the response may comprise, for example, safety-related readings. The safety-related readings may be determined, for example, from safety contacts or sensors connected to the second safety node 112. The safety-related readings may relate to, for example, opening of a safety contact of a door or an end limit switch, an overspeed situation of an elevator car, operation of a safety gear, operation of mechanical safety devices, control command of a machinery brake or a car brake. The second safety node 112 may then send the second safety information within the predetermined cycle.

In an embodiment, the first safety node 110 may be configured to determine a safety status of the elevator in response to receiving the safety information from the second safety node 112. If an error is detected, the first safety node may send an activation command, for example, to activate brakes or switch off power supply of a motor of an elevator car.

In an embodiment, there is provided an elevator system comprising an elevator car and the safety system 116. The second node 104 may be arranged in the elevator car of the elevator system, for example, on the roof of the elevator car. The first node 102 may be a separate node connected to the first safety node 110 (for example, a main safety circuit). Alternatively, the first node 102 may be integrated in another node of the elevator system.

In one embodiment, the first safety node 110 and the second safety node 112 as well as the related communication system may be designed according to rules for programmable electronic safety devices for elevators (pessral) to fulfill adequate safety level, such as safety integrity level 3 (sil 3).

Figure 1B:
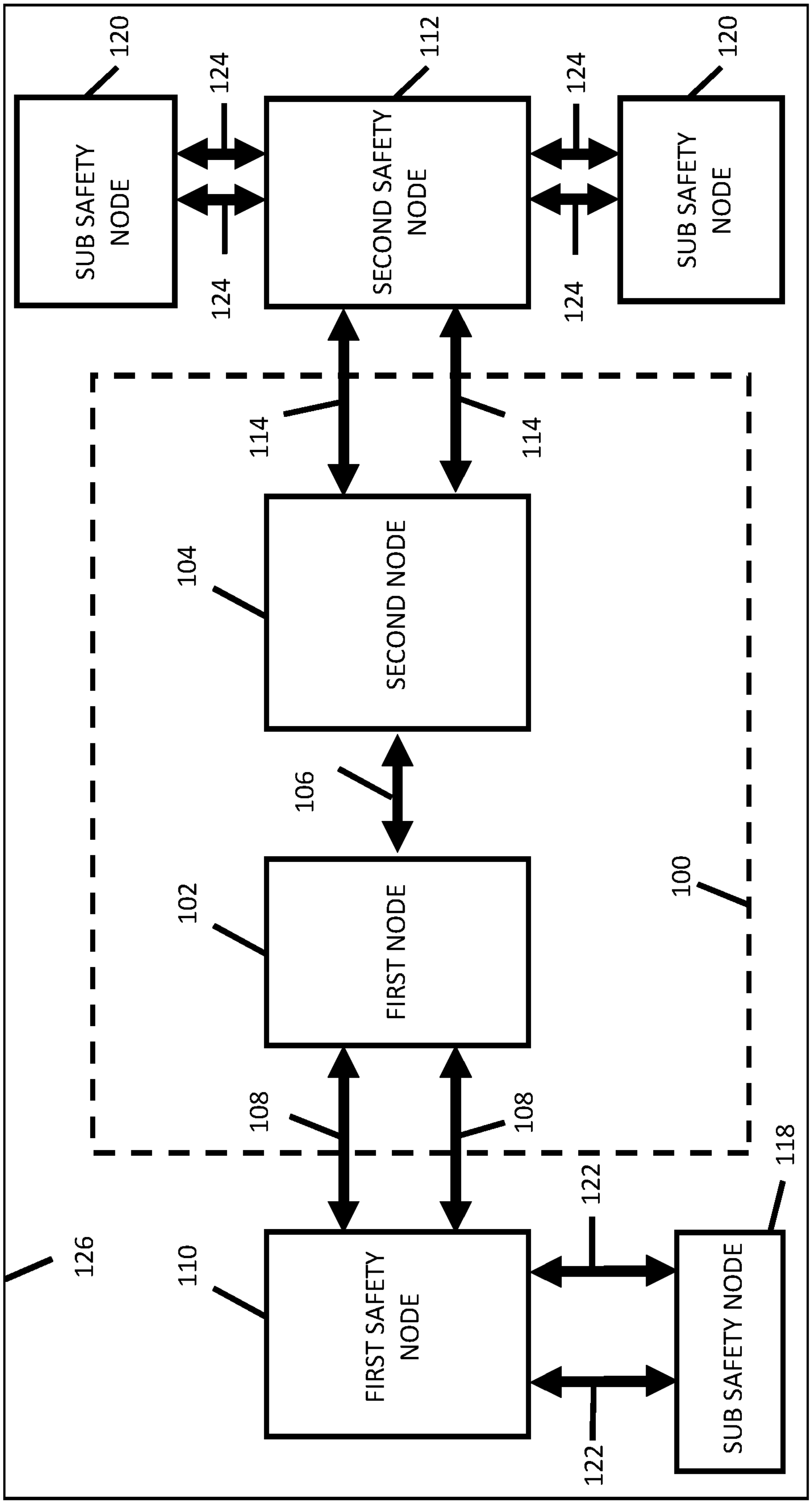
FIG. 1B illustrates a communication system for transmitting safety information in an elevator system according to another embodiment.

FIG. 1B illustrates a communication system 100 for transmitting safety information in an elevator system according to another embodiment. The communication system 100 of FIG. 1B is identical with the communication system 100 of FIG. 1A already discussed above. In addition to the elements already discussed in relation to FIG. 1A, a safety system 126 of FIG. 1B comprises one or more sub safety nodes 118, 120. The sub safety node 118 may refer, for example, to one or more safety contacts connected to the first safety node 110. The sub safety node 120 may refer, for example, to various sensors or contacts, for example, one or more car safety contacts, one or more door sensors, one or more position sensors, and/or one or more car roof sensors connected to the second safety node 112. The first safety node 110 may receive information from the sub safety node 118 via two parallel communication channels 122. Similarly, the second safety node 112 may receive information from the sub safety node 120 via two parallel communication channels 124.

Figure 2:
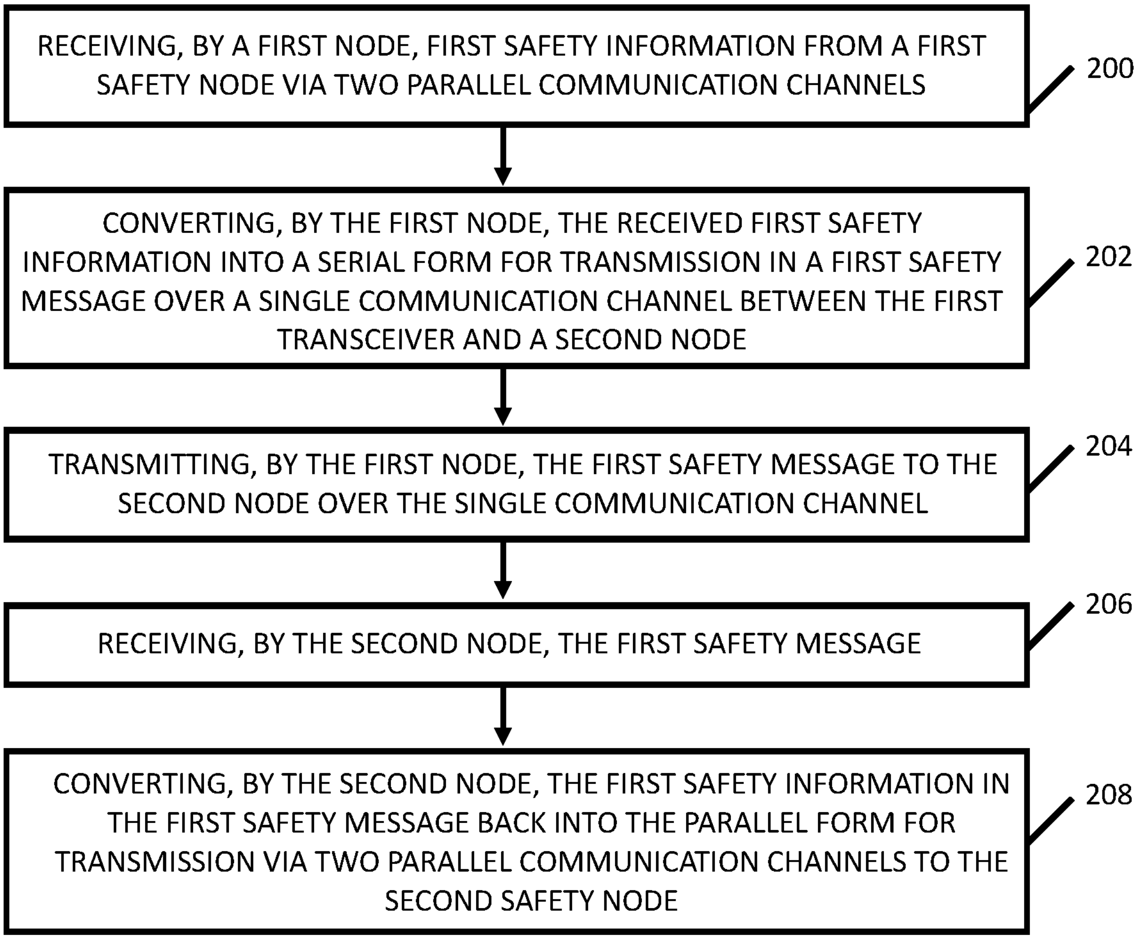
FIG. 2 illustrates a method for transmitting safety information in a communication system of an elevator system according to an embodiment.

FIG. 2 illustrates a method for transmitting safety information in a communication system 100 of an elevator system according to an embodiment. Elements involved in performing the method have been discussed in more detail in FIGS. 1A and 1B.

At 200 first safety information is received by a first node 102 from a first safety node 110 via two parallel communication 108 channels.

At 202 the received first safety information is converted by the first node 102 into a serial form for a transmission in a first safety message over a single communication channel 106 between the first node 102 and a second node 104.

At 204 the first safety message is transmitted by the first node 102 to the second node 104 over the single communication channel 106.

At 206 the first safety message is received by the second node 104.

At 208 the first safety information in the first safety message is converted by the second node 104 back into the parallel form for transmission via two parallel communication channels 114 to a second safety node 112.

The method may be implemented, for example, by the communication system 100 discussed above in relation to FIGS. 1A and 1B. In an embodiment, the single communication channel between the first node and the second node may be a wireless communication channel. When implementing wireless communication between the first node and the second node, no cabling for transmitting safety information is needed between the first node and the second node. Alternatively, the single communication channel between the first node and the second node may be a wired communication channel.

Further, the second node 104 may receive second safety information from the second safety node 112 via the two parallel communication channels 114 and convert the second safety information into a serial form for transmission in a second safety message over the single communication channel 106 between the first node 102 and the second node 104, and the first node 102 may receive the second safety message and convert the second safety information in the second safety message back into the parallel form for transmission via the two parallel communication channels 108 to the first safety node 110.

Further, the first node 102 may determine timing difference between the first safety information received from the two parallel communication channels 108 and add the timing difference to the first safety message, and the second node may convert the first safety information back into the parallel form based on the timing difference for the transmission via two parallel communication channels 114 to the second safety node 112. Further, in one embodiment, the first node 102 receives the first safety information in predetermined cycles from the first safety node 110.

The exemplary embodiments and aspects of the invention can be included within any suitable device, for example, including, servers, workstations, capable of performing the processes of the exemplary embodiments. The exemplary embodiments may also store information relating to various processes described herein. Further, an exemplary embodiment discussed above may be combined with one or more of other above discussed embodiments to form a further embodiment.

Example embodiments may be implemented in software, hardware, application logic or a combination of software, hardware and application logic. The example embodiments can store information relating to various methods described herein. This information can be stored in one or more memories, such as a hard disk, optical disk, magneto-optical disk, RAM, and the like. One or more databases can store the information used to implement the example embodiments. The databases can be organized using data structures (e.g., records, tables, arrays, fields, graphs, trees, lists, and the like) included in one or more memories or storage devices listed herein. The methods described with respect to the example embodiments can include appropriate data structures for storing data collected and/or generated by the methods of the devices and subsystems of the example embodiments in one or more databases.

All or a portion of the example embodiments can be conveniently implemented using one or more general purpose processors, microprocessors, digital signal processors, micro-controllers, and the like, programmed according to the teachings of the example embodiments, as will be appreciated by those skilled in the computer and/or software art(s). Stored on any one or on a combination of computer readable media, the examples can include software for controlling the components of the example embodiments, for driving the components of the example embodiments, for enabling the components of the example embodiments to interact with a human user, and the like. Such computer readable media further can include a computer program for performing all or a portion (if processing is distributed) of the processing performed in implementing the example embodiments. Computer code devices of the examples may include any suitable interpretable or executable code mechanism, including but not limited to scripts, interpretable programs, dynamic link libraries (DLLs), Java classes and applets, complete executable programs, and the like.

The components of the example embodiments may include computer readable medium or memories for holding instructions programmed according to the teachings and for holding data structures, tables, records, and/or other data described herein. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer. A computer-readable medium may include a computer-readable storage medium that may be any media or means that can contain or store the instructions for use by or in connection with an instruction execution system, apparatus, or device, such as a computer. A computer readable medium can include any suitable medium that participates in providing instructions to a processor for execution. Such a medium can take many forms, including but not limited to, non-volatile media, volatile media, transmission media, and the like.

While there have been shown and described and pointed out fundamental novel features as applied to preferred embodiments thereof, it will be understood that various omissions and substitutions and changes in the form and details of the devices and methods described may be made by those skilled in the art without departing from the spirit of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or embodiments may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

The invention claimed is:

1. A communication system for transmitting safety information in an elevator system, the communication system comprising:

a first node; and a second node; wherein the first node is configured to receive first safety information from a first safety node via two parallel communication channels, to convert the received first safety information into a serial form for transmission in a first safety message over a single communication channel between the first node and the second node and to transmit the first safety message to the second node over the single communication channel; and the second node is configured to receive the first safety message and to convert the first safety information in the first safety message back into the parallel form for redundant transmission via two parallel communication channels to a second safety node, wherein the first node is further configured to determine a timing difference between the first safety information received from the two parallel communication channels and to add the timing difference to the first safety message, and the second node is configured to convert the first safety information in the first safety message back into the parallel form based on the timing difference.

2. The communication system of claim 1, wherein:

the second node is configured to receive second safety information from the second safety node via the two parallel communication channels and to convert the second safety information into a serial form for transmission in a second safety message over the single communication channel between the first node and the second node; and the first node is configured to receive the second safety message and to convert the second safety information in the second safety message back into the parallel form for transmission via the two parallel communication channels to the first safety node.

3. The communication system of claim 1, wherein the first safety information includes a first part received via the first parallel communication channel and a second part received via the second parallel communication channel:

the first node is configured to determine timing difference between the first part of the first safety information and the second part of the first safety information and to add the timing difference to the first safety message; and the second node is configured to convert the first safety information back into the parallel form based on the timing difference for the transmission via two parallel communication channels to the second safety node.

4. The communication system of claim 1, wherein the first node is configured to receive the first safety information in predetermined cycles from the first safety node.

5. The communication system of claim 1, wherein the single communication channel between the first node and the second node is a wireless communication channel.

6. The communication system of claim 1, wherein the single communication channel between the first node and the second node is a wired communication channel.

7. A safety system of an elevator system, the safety system comprising the communication system of claim 1, and further comprising:

a first safety node; and a second safety node; wherein the first safety node is configured to send first safety information comprising at least one request to the second safety node via the communication system; and the second safety node is configured to send second safety information comprising a response to the first safety node via the communication system in response to receiving the at least one request.

8. The safety system of claim 7, wherein the first safety node is configured to send the first safety information in predetermined cycles.

9. The safety system of claim 8, wherein the second safety node is configured to send the second safety information within the predetermined cycle.

10. An elevator system comprising:

an elevator car; and a safety system of claim 7, wherein the second node is configured in the elevator car of the elevator system.

11. The communication system of claim 2, wherein the first safety information includes a first part received via the first parallel communication channel and a second part received via the second parallel communication channel:

the first node is configured to determine timing difference between the first part of the first safety information and the second part of the first safety information and to add the timing difference to the first safety message; and the second node is configured to convert the first safety information back into the parallel form based on the timing difference for the transmission via two parallel communication channels to the second safety node.

12. The communication system of claim 2, wherein the first node is configured to receive the first safety information in predetermined cycles from the first safety node.

13. The communication system of claim 3, wherein the first node is configured to receive the first safety information in predetermined cycles from the first safety node.

14. The communication system of claim 2, wherein the single communication channel between the first node and the second node is a wireless communication channel.

15. The communication system of claim 3, wherein the single communication channel between the first node and the second node is a wireless communication channel.

16. The communication system of claim 4, wherein the single communication channel between the first node and the second node is a wireless communication channel.

17. The communication system of claim 2, wherein the single communication channel between the first node and the second node is a wired communication channel.

18. The communication system of claim 3, wherein the single communication channel between the first node and the second node is a wired communication channel.

19. The communication system of claim 4, wherein the single communication channel between the first node and the second node is a wired communication channel.

20. A method for transmitting safety information in a communication system of an elevator system, the method comprising:

receiving, by a first node, first safety information from a first safety node redundantly via two parallel communication channels;

converting, by the first node, the received first safety information into a serial form for transmission in a first safety message over a single communication channel between the first node and a second node;

determining, by the first node, a timing difference between the first safety information received from the two parallel communication channels;

adding, by the first node, the timing difference to the first safety message;

transmitting, by the first node, the first safety message to the second node over the single communication channel;

receiving, by the second node, the first safety message; and converting, by the second node, the first safety information in the first safety message back into the parallel form based on the timing difference for redundant transmission via two parallel communication channels to a second safety node.

* * * * *